Figures 1, 5, 6:
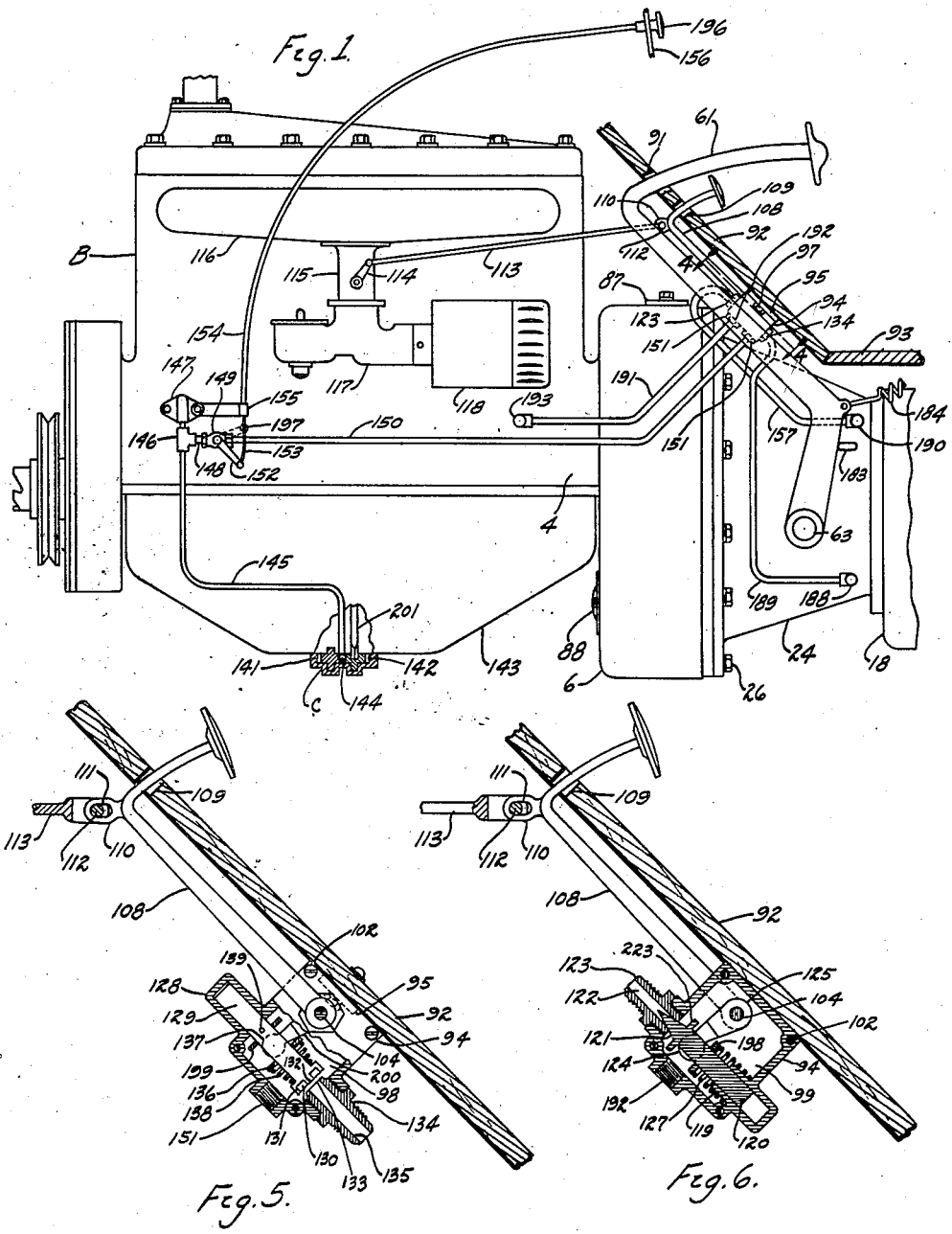

Jan. 19, 1937.　　　　J. W. TATTER　　　　2,068,579
CONTROL MECHANISM FOR CLUTCHES
Filed Feb. 27, 1932　　　2 Sheets-Sheet 1

INVENTOR.
John W. Tatter
BY George B. Ingersoll
ATTORNEY.

Jan. 19, 1937.    J. W. TATTER    2,068,579
CONTROL MECHANISM FOR CLUTCHES
Filed Feb. 27, 1932    2 Sheets-Sheet 2
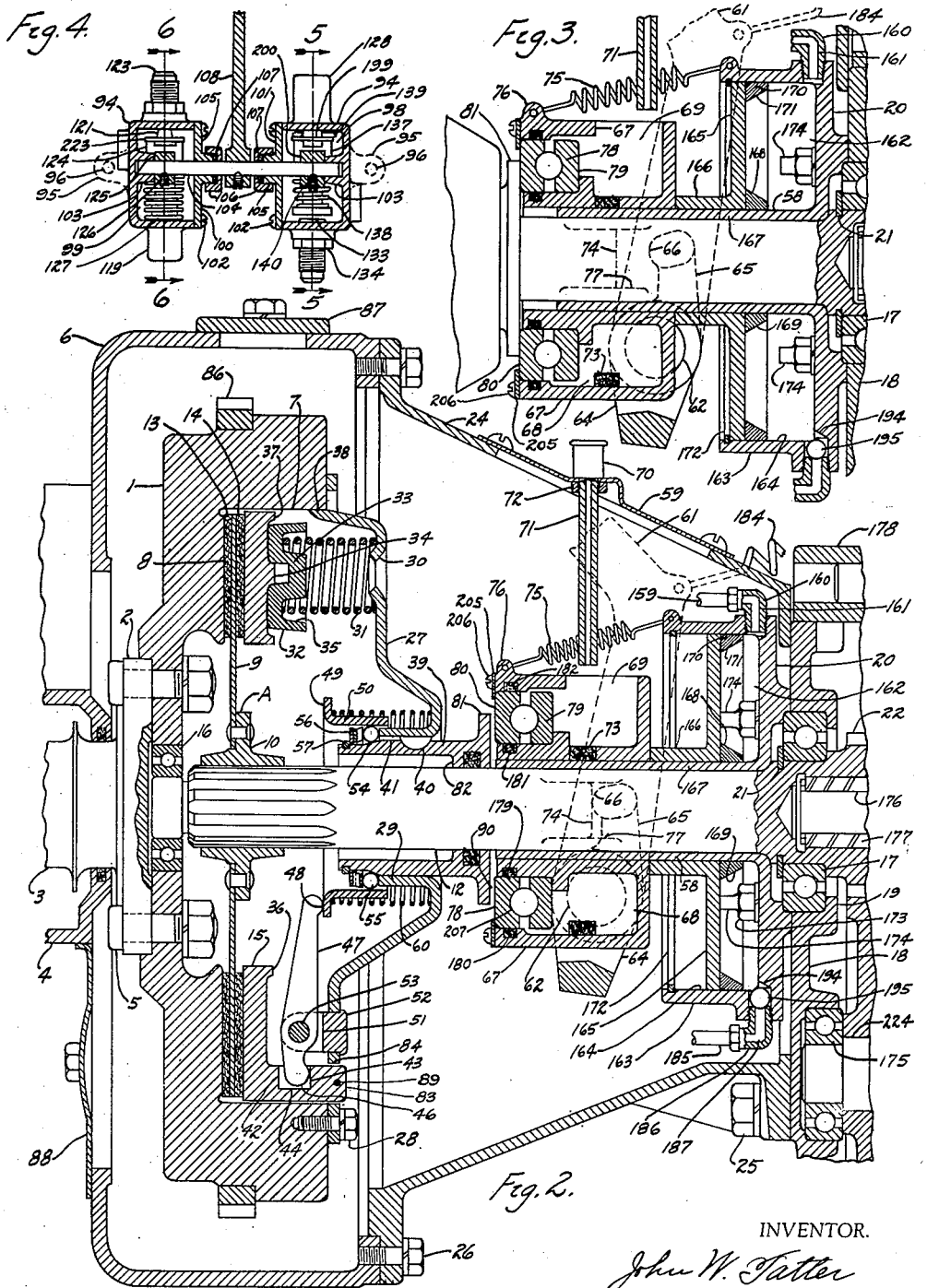
INVENTOR.
John W. Tatter
BY George B. Ingersoll
ATTORNEY.

Patented Jan. 19, 1937

2,068,579

UNITED STATES PATENT OFFICE 2,068,579

CONTROL MECHANISM FOR CLUTCHES

John W. Tatter, Detroit, Mich., assignor of one-half to George B. Ingersoll, Dearborn, Mich.

Application February 27, 1932, Serial No. 595,474

10 Claims. (Cl. 192—83)

My invention relates to improvements in a control mechanism for clutches as used in motor vehicles, said clutches comprising friction members, and the objects of my improvement are, first, to provide a mechanism that will automatically operate a clutch when the control mechanism of the engine of a motor vehicle is being operated; second, to provide a control mechanism that will provide for the free wheeling of a motor vehicle; third, to provide a clutch control mechanism operated by liquid pressures; fourth, to provide a clutch control mechanism hydraulically operated in conjunction with the oil system of the engine of a motor vehicle; fifth, to provide an automatically operated control mechanism for use with an automatically adjusted clutch; sixth, to provide a control mechanism operatively controlled by the accelerator pedal of a motor vehicle; seventh, to provide a pedal mechanism for simultaneously controlling the speed of an engine and the operation of a hydraulically operated mechanism for controlling a clutch mechanism; eighth, to provide an engine speed accelerator pedal operatively connected with a pair of hydraulic control valves; ninth, to provide a pair of hydraulic control valves simultaneously operated by an accelerator pedal for an engine; tenth, to provide a hydraulically operated piston within a housing enclosing a clutch mechanism controlled by the hydraulically operated piston; and eleventh, to provide a clutch control mechanism operatively connected with a clutch automatically adjusted for wear in its friction members.

I attain these objects by the mechanism illustrated in the accompanying drawings, in which—

Figure 1 is a view disclosing an installation of the control mechanism connected with the engine of a motor vehicle; Fig. 2, a sectional view of the clutch and the control mechanism within the flywheel and its enclosing housing, said clutch being disclosed in its engaged position; Fig. 3, a partial sectional view of the control mechanism when the clutch is in a disengaged position; Fig. 4, a sectional view of the valve control mechanism on the line 4—4, Fig. 1; Fig. 5, a sectional view of one of the control valves on the line 5—5, Fig. 4, together with the accelerator pedal of a motor vehicle; and Fig. 6, a sectional view of one of the control valves on the line 6—6, Fig. 4.

Similar numerals refer to similar parts throughout the several views.

The clutch mechanism as disclosed herein is similar to the clutch mechanism disclosed and claimed in my patent application for a clutch, Serial No. 528,861, filed April 9, 1931.

The flywheel 1 is mounted on the flange 2 of a crankshaft 3 of an engine, supported in the crankcase 4. The flywheel 1 is held onto the flange 2 by the bolts 5. The crankcase 4 is provided with a bell housing 6 in which the flywheel 1 revolves. The flywheel 1 is provided with the chamber 7, together with the friction face 8. The driven member assembly A comprises the friction disc 9 which is fastened to the hub 10, the hub 10 being suitably mounted on the splines of the shaft 12. The friction members 13 and 14 may be suitably fastened to the friction disc 9, the friction member 13 being disposed between the friction face 8 of the flywheel 1 and the face of the friction disc 9. Friction member 14 is similarly disposed between the friction disc 9 and the thrust member 15. The shaft 12 is supported at its front end in the bearing assembly 16, which is mounted in a recess of the flywheel 1, and at its rear end in the bearing assembly 17, which is mounted in the transmission housing 18.

The bearing assembly 17 is maintained by the shoulder 19 of the transmission housing 18 and also by the retainer 20, which is suitably fastened to the transmission housing 18. The bearing assembly 17 is further retained on the shaft 12 by the retainer 21, the shaft 12 incorporating the gear member 22, as similarly used in the usual type of transmission. The retainer 20 may be piloted over the bearing assembly 17. The clutch housing 24 is suitably fastened to the transmission housing 18 by the screws 25. The clutch housing 24 is fastened to the rear face of the bell housing 6 by the screws 26.

The cover member 27 is fastened to the rear face of the flywheel by the screw 28, the cover member 27 being provided with an extension portion 29. The cover member 27 is provided with a series of depressed portions 30, which fit within and locate one end of the springs 31, which are thus supported against the cover member 27 and exert a thrust against the baffle members 32. The baffle members 32 are each provided with the boss 33, which locates the spring 31 at its forward end. The baffle member 32 is located by loosely fitting over the boss 34 of the thrust member 15. The boss 34 may have tapered sides fitting within similar tapered holes in the recess in the boss 33 of the baffle member 32.

The baffle member 32 has its outer wall portion so located as to provide an enlarged recess portion 35 around the inner end of the spring 31. The recess portion 35 has its inner wall surfaces located away from the inner end of the spring 31, the walls of the recess portion 35 extending outwardly from the thrust member 15 to provide a member for baffling the heat generated in the thrust member 15 away from the springs 31. To further prevent the heat, which will be developed in the thrust member by the operation of the clutch, from being conducted into the spring 31, the baffle member 32 is constructed of insulator material, such as asbestos composition material, having a very low coefficient of heat conductivity. It will thus be noted that the heat which is generated in the thrust member 15 will be unable to be conducted through the baffle member 32 to the spring 31 and also the baffle member 32 will further protect, by its walls surrounding the recess portion 35, the spring 31 from receiving radiant heat directly onto the coils of the spring 31. This construction will provide means for eliminating the breaking down of the springs 31 due to the radiated and conducted heat from the thrust member 15 which constitutes a great weakness of design in the usual type of clutch assembly incorporating thrust springs of this type located in close proximity to the clutch thrust members.

It is to be further noted that the small holes which are made in the cover member 27 are located within the end of the spring 31, thus forming a ventilating opening at the rear end of the springs, this further facilitating the maintaining of the spring 31 from taking a set or collapsing from heat in the springs. This small hole communicating directly with the space within the clutch housing 24 outside of the cover member thus maintains a supply of circulated air for each individual spring. The thrust member 15 is provided with the extension portion 36 at its inner edge and the extension portion 37 at its outer edge, which provide added strength for resisting thrust reactions. The cover member 27 is provided with a series of projections 38 which may be used for piloting the cover member 27 into the chamber 7 of the flywheel 1.

The projections 38 may be formed by making suitable openings in the cover member 27 and displacing the metal of the openings to provide the extensions 38 at the proper point for piloting purposes, the outer surfaces of the projections 38 being suitably finished to pilot dimensions. The sleeve member 39 is slidably mounted in the extension portion 29 of the cover member and is restrained from turning therein by the key 40, the key 40 engaging the keyway 41 of the extension portion 29 together with the sleeve member 39. The thrust member 15 is provided with the surfaces 42 and 43 which form the sides of the chamber 44. Between the surfaces 42 and 43, the chamber is thus provided for receiving the outer ends 46 of the levers 47. The levers 47 are provided at their inner portions with the ends 48 for engaging the flange 49 of the sleeve member 50. The levers 47 are pivotally mounted in the yoke members 51, the yoke members 51 being provided with portions 52 for riveting to the cover member 27, the portions 52 having a rectangular shape to prevent turning in the cover member 27. A pin 53 extends through the lever 47 and the forked portion of the yoke member 51.

The sleeve member 39 is provided with the inclined surface 54 which extends around the sleeve 39 and engages the balls 55, the balls 55 further engaging the ends of the extension portion 29 of the cover member 27 together with the inside surface of the sleeve member 50, the balls 55 being held against the inclined surface 54 and against the end of the extension portion 29 of the cover member 27 by the resilient member 56, the thrust of the resilient member 56 being taken by the lock ring 57 which fits within a groove in the sleeve 39. Any suitable number of balls 55 may be provided to withstand any given loads as developed by the clutch mechanism. The spring 60 is interposed between the cover member 27 and a face of the flange 49 of the sleeve member 50, the spring 60 always tending to maintain the flange 49 of the sleeve member 50 in engagement with the levers 47.

The pedal 61 is suitably mounted on and connected to the shafts 62 and 63, the shafts 62 and 63 being suitably connected to and supporting therebetween the yoke member 64, the pedal 61 being located on the outside of the clutch housing 24 in the conventional manner as employed in motor vehicles. The shafts 62 and 63 are suitably supported in bearings carried on opposite sides of the clutch housing 24. The yoke member 64 is provided with a pair of arms 65 which extend upwardly on each side of the main shaft 12 and are provided with rounded extension portions 66, which engage the rear face of the portions 74 of the member 67. The member 67 is provided with the lubricant reservoir 68 which is formed by a chamber extending around the shaft 12 and extension portion 58 of the retainer 20, the extension portion 58 having a bearing portion on which the member 67 is slidably mounted. The member 67 is provided with an opening 69 at its top which permits the introduction of lubricant to the reservoir 68 from the outside of the clutch housing 24, the lubricant being introduced through the oil cup 70 which is suitably fastened to the tube 71 which extends to a position adjacent the opening 69 of the member 67. The tube 71 is suitably fastened in the cover 59 of the clutch housing 24 by the nut 72.

A wick 73 extends around the inside of the reservoir 68 and contacts with the extension portion 58 through a suitable opening in the upper portion of the member 67, thus providing for carrying the lubricant from the reservoir 68 to the upper portion of the extension portion 58, on which the member 67 slidably operates. The member 67 is provided with the portions 74 for engaging the extension portions 66 of the arms 65. A spring 75 attaches to the retainer 20 and to the boss 76 which is connected to the member 67, the spring 75 always tending to maintain the portions 74 of the member 67 in contact with the extension portions 66 of the yoke member 64. Also, the member 67 is provided with surfaces 77 which extend adjacent the inner ends of the extension portions 74, so that the member 67 is prevented from turning on the retainer 20. The member 67 also supports the bearing assembly 78, the ball race 79 having its inner diameter a pressed fit on the member 67, the ball race 80 contacting with the flange 81 of the sleeve 39, the ball race 80 being adapted to turn freely within the member 67. The sleeve 39 is provided with a boss portion 82, which has a bearing on the shaft 12, the boss portion 82 thus aiding in guiding the sleeve 39 in its movement during the operation of the clutch.

It is to be noted that the thrust plate 15 is provided with the extension portion 83 which extends through the opening 84 in the cover member 27, the cover member 27 thus providing a driving engagement with extension portion 83, thus in turn providing driving means for the thrust plate 15. It is to be noted that, when the operator depresses the pedal 61, the yoke member 64 to which the pedal is operatively connected will slidably move the member 67, which will force the race member 80 of the bearing assembly 78 against the flange 81 of the sleeve 39, the race member 80 being adapted to turn freely with the sleeve 39 when the flywheel 1 is revolving, the race member 79 remaining stationary on the member 67. As the sleeve 39 is slidably moved forward by the operation of the pedal 61, the inclined surface 54 of the sleeve 39 will force the balls 55 against the inside surface of the sleeve member 50.

It is to be noted that the inclined surface 54 extends completely around the sleeve 39 and, when moved forward, will wedge the balls into a locking position, thus causing the sleeve member 50 to also move forward with the movement of the sleeve 39, the flange 49 of the sleeve member 50 moving the ends 48 of the lever 47 towards the thrust member 15. The movement of the inner ends of the lever 47 toward the thrust member 15 will cause the ends 46 of the lever 47 to engage the surface 43, this in turn causing the thrust member 15 to move against the pressure of the springs 31 to a released position, this released position of the clutch thus establishing the clearance spaces between the friction members 13 and 14 and their engaging surfaces.

As the operator releases the pressure on the pedal 61 to allow the clutch to move from its released position to a fully engaged position as shown in Fig. 2, the springs 31 will force the thrust member 15 forward to its engaged position with the friction members 13 and 14, as disclosed in Fig. 2, this in turn causing the surface 43 to move the end 46 of the lever 47 toward the thrust member 15, this in turn causing the end 48 of the lever 47 to move rearwardly against the flange 49 of the sleeve member 50 and against the pressure of the spring 60, the pressure of the spring 60 being much less than the combined pressures of the springs 31. The sleeve 50 being still locked by the balls 55 engaging the inclined surface 54 of the sleeve member 39 and the inside surface of the sleeve member 50 will cause the sleeve member 39 together with the member 67 and the bearing assembly 78 to move back to its released position as shown in Fig. 2. As the sleeve member 39 moves rearwardly from its position as shown in the released position of the clutch, as disclosed in Fig. 3, the inclined surface 54 will move rearwardly sufficiently to release the balls from their locked and engaged position with the inner surface of the sleeve member 50 and the inclined surface 54, this movement of the sleeve member 39 rearwardly to its unlocked position being sufficient to allow the balls to slightly drop away from the inside surface of the sleeve member 50, the balls 55 riding down the inclined surface 54 of the sleeve 39. It is to be noted, however, that the balls 55 are always maintained in contact with the end of the extension portion 29 of the cover member 27 by the resilient member 56 which engages the balls 55. This unlocked position of the balls 55 when the clutch is in its fully engaged position will allow the springs 31, every time the clutch is operated to its engaged position, as disclosed in Fig. 2, to cause the levers 47 to move the sleeve member 50 rearwardly an additional distance, which will correspond to the amount of the wear taking place on the friction members 13 and 14.

It will thus be seen that every time the clutch is operated the balls 55 will be unlocked sufficiently to allow the springs 31 to cause the thrust member 15 to always move forwardly into engagement with the friction members 13 and 14, to take up any wear that may have occurred on the friction members 13 and 14. It will thus be seen that the clutch will provide automatically for always taking up the wear clearance which may occur in its driving mechanism, so that the pedal 61 will not have to be adjusted to maintain said pedal in its proper operating position.

Also, the thrust member 15 will not have to be manually adjusted in any way to take up wear clearances. The flywheel 1 is disclosed as being provided with a starting ring 86. Also, the bell housing 6 is provided with inspection covers 87 and 88.

The extension portions 83 may be provided with holes to receive the pins 89 for holding the thrust member 15 in assembly with the baffle member 32, the spring 31, and the cover member 27 for shipment purposes. After the clutch has been assembled in the flywheel 1, the pins 89 may be removed and the extension portions 83 then will be permitted to slidably move in the cover member 27 when the clutch is operated.

It is to be noted that, when the clutch is in its fully engaged position, as disclosed in Fig. 1, a clearance space 90 will be always maintained between the flange 81 of the sleeve 39 and the ball race 80.

The operation of the clutch mechanism is not only possible by manually operated means, as above described, but the clutch mechanism is also capable of being operated automatically, as hereinafter described.

In Fig. 1, the engine assembly B is disclosed with the crankcase 4, the bell housing 6, and the clutch housing 24 together with the pedal 61 and the members comprising the means for automatically operating or controlling the clutch mechanism.

The pedal 61 extends through the opening 91 in the toe board 92, which together with the floor board 93 may be suitably supported from the body and frame (not shown) of the chassis of which the engine assembly A forms a portion.

The valve housing 94 is provided with the flange 95, as disclosed in Fig. 1 and indicated by dotted lines in Fig. 4, the flange 95 being provided with holes 96, through which extend the screws 97, for attaching to the toe board 92.

The valve housing 94 comprises a pair of housing members operatively connected together by the shaft 104 and each provided with attaching flanges 95, said housing 94 being provided with the hydraulic chambers 98 and 99 which are closed at their inner sides by the covers 100 and 101 which are secured by the screws 102, the covers 100 and 101 together with the valve housing 94 being provided with suitable means therebetween, such as gaskets, to maintain a tight joint. The housing 94 is provided with the bosses 103 in which is supported the shaft 104, the shaft 104 being further supported in the bosses 105 of the covers 100 and 101, the bosses 105 being threaded to receive the nuts 106 which secure the packing 107 around the shaft 104.

The accelerator pedal 108 is secured to the shaft 104 and is adapted to oscillate therewith, the accelerator pedal 108 extending through the opening 109 in the toe board 92. The accelerator pedal 108 is provided with the boss 110 which is further provided with a slot 111 in which slides the pin 112 to which is pivotally connected the rod 113 which is also pivotally connected to the lever 114 which controls the opening and closing movements of a throttle valve (not shown) in the housing 115 which is suitably attached to the intake manifold 116 of the engine assembly B, the housing 115 forming a portion of the carburetor 117 to which is attached the air cleaner 118.

The housing 94 is further provided with the boss 119 in which is slidably supported the valve 120 which is provided with the conical valve portion 121 which is adapted to seat at the inner end of the passage 122 of the connection 123 which is threadably secured to the housing 94. The valve 120 is provided with the shoulder 223 and washer 198 between which extend the yoke portion 124 of the lever 125 which is secured to the shaft 104, the yoke portion 124 straddling the valve 120 and engaging the shoulder 223 and the washer 198 to operate the valve 120 to open and closed positions relative to the passage 122. The lever 125 is secured to the shaft 104 by the screw 126. The spring 127 encircles the boss 119 and engages the housing 94 and the washer 198, thus always tending to maintain the valve 120 in its closed position, this further tending to maintain the accelerator pedal 108 in its normal position in which the pedal 108 is not being depressed by the operator to actuate the throttle, of the housing 115, to its open or engine accelerating position, thus eliminating the use of an accelerator pedal return spring outside of the valve housing 94.

The housing 94 is also further provided, in the housing enclosing the hydraulic chamber 98, with the boss 128 in which is slidably supported the valve 129 which is provided with the valve seat 130 which is vulcanized in the recess 131, the valve seat 130 having a central opening fitting around the boss 132, the valve seat 130 being constructed of resilient or deformable material such as rubber composition having oil resisting characteristics.

The valve seat 130 is adapted to contact with the seat portion 133 of the connection 134 which is threadably secured in a boss of the housing 94, the valve seat 130 thus providing means for opening and closing the passage 135 of the connection 134 relative to the passage of hydraulic liquid therethrough. The valve 129 is provided with the washers 136 and 199 between which extend the yoke portion 137 of the lever 200 which is secured to the shaft 104, the yoke portion 137 straddling the valve 129 and engaging the washer 136 to operate the valve 129, together with its valve seat 130, to open and closed positions relative to the passage 135.

The washers 136 and 199 may be provided, as disclosed in Fig. 4 by the members slidably mounted on the valve 129 with the yoke portion 137 therebetween, the spring 138 being interposed between the washer 136 and the shoulder of the boss around the recess 131, the spring 138 thus maintaining the washer 136 in engagement with the yoke portion 137, the washer 199 thus being forced to a locating position against the pin 139.

The lever 200 is secured to the shaft 104 by the screw 140. It is to be noted that, when the accelerator pedal 108 is depressed to actuate the lever 114 to open the throttle valve in the housing 115, the valve 120 will be moved to its open position and the valve 129 will be moved to its closed position, the spring 138 cushioning the thrust of the yoke portion 137, as the valve seat 130 is compressed against the valve seat portion 133, thus preventing the valve seat 130 from being unduly distorted by the shock of the thrust movement of the yoke portion 137 against the valve parts.

The engine assembly B is provided with the oil pump C which may comprise the gear members 141 and 142, the gear 142 being suitably driven by the shaft 201 which may be suitably connected to and driven by operative portions of the engine assembly B, such as the cam shaft (not shown). It is to be understood, that whereas I disclose a gear member type of means for developing pressure in the lubrication system of an engine, as the means for developing hydraulic pressure for my clutch control mechanism, my invention is adapted to be operated by hydraulic pressure developed by or in the lubrication system of any engine and may further be operated, when desired, by any means of developing hydraulic pressure independent of the lubrication system of an engine.

The hydraulic liquid may be drawn, by the pump C, from the lower portion of the oil pan 143, through the opening 144 and may be forced through the conduit and passage 145, through the three way pipe fitting 146 to the pressure regulating connection 147 which may be suitably connected to the distributing passages (not shown) of the lubrication means of the engine assembly B. The three way pipe fitting 146 is connected, by the conduit 148 to the shut off valve 149, the shut off valve 149 being connected, by the conduit 150, with the hydraulic chamber 98 in the valve housing 94, the conduit 150 being suitably connected to the threaded boss 151.

The shut off valve 149 is provided with the lever 152 which is operated by the flexible cable 153 which operates in the flexible conduit 154 which is supported in the clamp bracket 155 which may be suitably supported from the connection 147. The flexible conduit 154 may also be suitably supported by the instrument panel 156, a section of which is disclosed as it would be located approximately above the toe board 92 and in a position convenient to the operator of the motor vehicle. The button 196 is suitably attached to the flexible cable 153 and provides means for manually operating the lever 152 and shut off valve 149 to permit the operator of the motor vehicle to optionally use or disconnect from use, the control mechanism for operating the clutch mechanism.

The conduit 157 is suitably connected to the connection 123 in the valve housing 94 and is suitably attached to the connection 190 which is supported by the clutch housing 24, the conduit 157 being further connected to a conduit 159 within the clutch housing 24, the conduit 159 being suitably attached to the connection 160 which is secured in the retainer 20, the connection 160 being provided with the passage 161 which connects with the hydraulic chamber 162 which is located within the cylinder portion 163 of the retainer 20. The cylinder portion 163 of the retainer 20 is provided with the bore 164 in which slidably operates the piston 165 which is provided with the hub portion 166 which fits around and is guided by the extension portion 167 of the retainer 20, the extension portion 167 further guiding and supporting the member 67 in its operating movement.

The piston 165 is provided with the piston seal 168 which may be vulcanized to the piston 165 and is preferably made of resilient or deformable material such as rubber composition having oil resisting characteristics, the piston seal 168 being provided with the conico-cylinder surface 169 which permits the pressure of the hydraulic liquid in the chamber 162 to more efficiently force the piston seal 168 against the extension portion 167 of the retainer 20. Similarly, the piston seal 170 is vulcanized to the piston 165 and by its conico-cylindrical surface 171 permits the pressure of the hydraulic liquid in the chamber 162 to more efficiently force the piston seal 170 against the bore 164 of the cylinder portion 163.

It will thus be noted that the piston 165 will be efficiently sealed against the loss of hydraulic liquid between itself and the bore 164 and the extension portion 167, thus allowing the hydraulic pressure developed in the chamber 162 to move the piston 165 to the left until the piston 165 has been moved, from its position as disclosed in Fig. 2 and which corresponds to the engaged position of the clutch mechanism, to the position as disclosed in Fig. 3 which corresponds to the disengaged or released position of the clutch mechanism, the hub portion 166 of the piston 165 engaging and moving the member 67 together with its bearing assembly 78 to the left, the bearing assembly 78 engaging and moving the sleeve 39 to the left to operate the clutch mechanism to its engaged or released position.

The lock ring 172 may be installed in a groove around the bore 164 to provide a shoulder to act as a stop for the piston 165 at the extreme end of its movement to the left as disclosed in Fig. 3, thus preventing the automatic control mechanism from moving the clutch mechanism beyond a predetermined disengaged or released position. Also the screws 173 may be provided with the extension portions 174 which provide stops for the piston 165 at the extreme end of its movement to the right as disclosed in Fig. 2.

The retainer 20 may be secured to the transmission housing 18 by the screws 173. The transmission countershaft 224 is disclosed as being mounted on the bearing assembly 175 together with the transmission shaft 176 mounted on the bearing assembly 177.

The transmission cover is indicated at 178.

The member 67 is provided with the groove 179 and 180 in which are assembled the gaskets 181 and 182, the gaskets 181 and 182 providing a seal to prevent lubricant leaking from the reservoir 69 of the member 67 around the bearing assembly 78, the race 80 of which is free to turn with the sleeve 39, as the race 80 engages the shoulder 81 of the sleeve 39 as said sleeve 39 is revolving with the clutch mechanism.

The pedal 61 is maintained in its normal position against the stop 183 by the spring 184 which may be suitably anchored to the transmission 18.

The conduit 185 is suitably secured to the connection 186 which is provided with the passage 187 which connects with the hydraulic chamber 162, the conduit 185 being further suitably connected to and supported by the connection 188 which is secured in the clutch housing 24. The conduit 189 is attached to the connection 188 and the connection 134 which is secured to the valve housing 94.

The conduit 191 is suitably attached to the threaded boss 192 of the valve housing 94 and to the connection 193, the connection 193 being connected to the lubrication system of the engine assembly B and providing for the return of hydraulic liquid from the valve housing 94 to the lower portion of the oil pan 143.

The passage 187 of the connection 186 connects with the chamber 194 which is constructed in such manner as to retain the ball 195 therein, the ball 195 seating on the connection 186 at the upper end of the passage 187 and acting as a ball check valve to prevent the hydraulic liquid from draining out of the hydraulic chamber 162 when the control mechanism is in its position corresponding to the engaged position of the clutch mechanism as disclosed in Fig. 2, thus always insuring that the hydraulic chamber 162 is filled with hydraulic liquid and insuring a quick response of the piston 165 as soon as the shut off valve 149 is opened and eliminating the necessity of the hydraulic chamber 162 from filling each time the clutch control mechanism is operated.

Also the ball 195 will prevent the hydraulic liquid from draining out of the hydraulic chamber 162 when the clutch control mechanism is in its released or free wheeling position, as disclosed in Fig. 3, when the pressure of the hydraulic liquid is at its minimum due to the slow or idling speed of the engine assembly B.

It is to be noted, however, that the construction of the chamber 194 will permit the ball 195 to raise sufficiently off of its seat on the connection 186 to allow hydraulic liquid to be forced through the passage 187 into the hydraulic chamber 162.

In operation, the operator may pull the button 196 to the right from the instrument panel 156, Fig. 1, thus causing the flexible cable 153 to move the lever 152 upwardly to the position as indicated by the dotted lines 197, this further causing the shut off valve 149 to open and allow the hydraulic pressure, of the liquid or lubricant that is being developed in the lubrication system of the engine assembly B, comprising the conduit 145, three way cock 146, and the pressure regulating connection 147, by the gear members 141 and 142, to be transmitted through the conduit 148, the shut off valve 149, the conduit 150, and the threaded boss 151 to the hydraulic chamber 98 in the housing 94, from whence it will pass through the passage 135 of the connection 134, the conduit 189, the connection 188, the conduit 185, and through the passage 187 of the connection 186 past the ball check valve 195 into the hydraulic chamber 162 thus releasing the clutch mechanism as shown in Fig. 3.

Thus the clutch control mechanism will be operatively connected so that it will be automatically operated in conjunction with the accelerator control mechanism, and will provide free wheeling characteristics of the motor vehicle, the engine assembly B being automatically disconnected from being driven by the forward movement of the motor vehicle when the accelerator pedal 108 is not being depressed and also providing for automatic engagement of the clutch mechanism when the accelerator pedal 108 is depressed to accelerate the speed of the engine assembly B and the motor vehicle, this being accomplished without the objectionable and continual movement of the pedal 61, as occurs in the usual type of clutch control mechanism with each engagement of the clutch mechanism.

It is also to be noted that the pedal 61 will always remain in its normal position even when the friction members 13 and 14 have become worn, this being accomplished by the automatically operated clutch adjusting mechanism as above described.

It is also to be noted that the pedal 61 is always available to permit the clutch mechanism to be operated in the usual manner by manual means should anything occur to render the automatically operated control mechanism inoperable.

It is to be noted that the relatively large diameter of the hydraulic chamber 162 will provide sufficient pressure to move the piston 165 to the left, even when the engine assembly B is operating at a low speed with a relatively low hydraulic pressure per square inch of area developed in the lubrication system of the engine assembly B by the gear members 141 and 142.

As the piston 165 is moved to the left, Fig. 3, by the pressure thus developed in the hydraulic chamber 162, the hub portion 166 of the piston 165 will engage the member 67, the member 67 thus causing the race 80 of the bearing assembly 78 to engage the flange 81 of the sleeve 39, the inclined surface 54 of the sleeve 39 causing the ball members 55 to engage the sleeve 50, the flange 49 of the sleeve 50 moving the levers 47 to the left and causing the thrust member 15 to overcome the pressure of the springs 31 and to assume a disengaged position.

When the pedal 108 is depressed to accelerate the speed of the engine assembly B, through the movement of the rod 113 and the lever 114 to open the throttle valve (not shown) in the housing 115, the accelerator pedal 108 will cause the shaft 104 and the lever 125, together with its yoke portion 124 to depress the spring 127 by the washer 198, thus allowing the conical valve portion 121 to be moved off its coacting seat by the hydraulic pressure in the passage 122, thus connecting the passage 122 with the hydraulic chamber 99, thus allowing the liquid under hydraulic pressure in the hydraulic chamber 162 of the retainer 20 to discharge from the hydraulic chamber 162 through the passage 161 of the connection 160, the conduit 159, the connection 190, the conduit 157 and through the passage 122 of the connection 123 into the hydraulic chamber 99 of the valve housing 94 from whence the hydraulic liquid will flow through the threaded boss 192, the conduit 191, and the connection 193 into the lubrication return system of the engine assembly B and further into the lower portion of the oil pan 143 where it will again be available to be drawn through the opening 144 by the gear members 141 and 142 and again be forced under pressure through the lubrication and clutch control systems.

It is also to be noted that as the accelerator pedal 108 is depressed, as above disclosed to provide for the release of the hydraulic liquid under pressures from the hydraulic chamber 162, the movement of the accelerator pedal 108, when being depressed as above disclosed, will at the same time, also cause the shaft 104, the lever 200, together with its yoke portion 137, and the washer 136, to move the valve 129 the movement of the valve 129 causing the valve seat 130 to contact the seat portion 133, and prevent the liquid under hydraulic pressure from further passing through the connection 134, the conduit 189, the connection 188, the conduit 185, the connection 186 and by the ball check valve 195 into the hydraulic chamber 162. As soon as the liquid is thus prevented from entering the hydraulic chamber 162 and developing pressure therein against the piston 165, the pressure of the springs 31 which have been maintained in their clutch release position, which corresponds to the position of the clutch control mechanism as indicated in Fig. 3, will cause the sleeve 39, the member 67, and the piston 165, together with their operatively connected parts, to move to the right to their positions as disclosed in Fig. 2, thus automatically causing the clutch mechanism to assume its engaged position.

It is to be further noted that the springs 127 and 138 will respectively allow the yoke portions 124 and 137 to move the washers 136 and 198 along the valves 120 and 129 to further compress the springs 127 and 138 after the valves 120 and 129 have respectively assumed their open and closed position, thus allowing for the full depressed movement of the accelerator pedal 108 to attain the maximum open throttle position corresponding to the maximum accelerated speed of the engine assembly B.

It is to be noted that my invention will provide for a very easy engagement of the clutch mechanism inasmuch as the opening movement of the valve 120 can be actuated gradually or quickly by the operator, the operator thus acquiring a "feel" of the operating mechanism, this permitting the operator to let the clutch mechanism in to its engaged position with the desired degree of ease, the open position of the valve 120 determining the amount and rapidity of the flow of the hydraulically actuated liquid therethrough.

It is also to be noted that the hydraulic chamber 162 will always be filled with liquid, thus insuring actuation of the piston 165 on its power stroke immediately upon connecting the hydraulic chamber 162 with the hydraulic pressure which is always present in the lubrication system of the engine assembly B, the liquid in the hydraulic chamber 162 always being prevented from returning through the connection 186 by the ball check valve 195.

It is also to be noted that the piston 165 will always be susceptible to immediate actuation by the hydraulic pressure of the liquid either in cold or hot weather, the hydraulic pressure of the liquid registering higher pressures when the liquid is in a congealed state as would be the case in cold weather.

It is also to be noted that the plate 205 may be attached to the end of the member 67 by the screws 206, the plate 205 loosely maintaining the race member 80 from moving toward the flange 81 except when the member 80 is actuated to engage the flange 81. Thus the race member 80 is maintained in the member 67 with freedom of rotation and with sufficient clearance endwise to permit it to cooperate with the balls 207 when contacting with the flange 81 and at the same time is so positioned as to insure maintenance of the clearance space 90 when the clutch is in its engaged position as disclosed in Fig. 2.

I claim:

1. In a control mechanism for a clutch connected with a transmission, the combination of a member provided with a hydraulic cylinder, said member being mounted on the transmission, a piston supported by said member, said piston being movably operated by hydraulic liquid pressure in the hydraulic cylinder of said member, means movably mounted on said member, said means being provided with a bearing member for engaging the clutch, and means for manually moving said last mentioned means to operate said clutch, said first mentioned means being further adapted to be moved by said piston to operate said clutch.

2. In a motor vehicle comprising a transmission and a clutch mechanism, the combination of a power means for actuating the clutch mechanism, said power means being located axially with and between the clutch mechanism and the transmission, and manual means for operating the clutch mechanism of the vehicle, said manual means being operable without operatively moving said power means.

3. In a motor vehicle comprising a clutch and a transmission, the combination of power means for actuating the clutch mechanism, said power means being located between the clutch mechanism and the transmission, and manual means for operating the clutch mechanism, said manual means being located between said power means and the clutch mechanism.

4. In a control mechanism for a clutch, the combination of a power means for operating the clutch, said power means being concentrically mounted with the clutch, and manually operable means for operating the clutch, said manually operable means being concentrically mounted with the clutch, said manually operable means being operable without operatively moving said power means.

5. In a control mechanism for a clutch, the combination of manually operated means for operating the clutch, said manually operated means comprising a lever member adapted for manual operation, and power means for operating said manually operated means to operate the clutch, said power means operating said manually operated means to operate the clutch without moving said lever member of said manually operated means, said power means and said manually operated means being operated in axial alignment.

6. In a control mechanism for a clutch, the combination of a fixed cylinder housing suitably mounted and provided with an extension portion, manually operated means movably mounted on the extension portion of said cylinder housing and adapted to operate the clutch, a piston movably mounted on the extension portion of said cylinder housing, and means for hydraulically operating said piston to move said manually operated means to operate the clutch.

7. In a clutch control mechanism, the combination of a hydraulically operated means for operating the clutch, manually operated means for operating the clutch, said manually operated means and said hydraulically operated means being located in axial alignment, said manually operated means comprising a lever member adapted for manual operation, a pair of valves for controlling the operation of said hydraulically operated means, each of said valves being provided with a valve seating portion at one of its ends, the ends of said pair of valves provided with said valve seating portions being located in their assembled positions in oppositely disposed relationship to one another, means for operating said valves simultaneously, and resilient means for returning said pair of valves to their normal positions.

8. In a clutch control mechanism, the combination of a pair of valve members suitably mounted, a shaft suitably mounted and extending approximately at right angles to said valves, said shaft being located at the sides of said valves with its axis extending at right angles to the axes of said valves, a pair of lever members each engaging one of said pair of valve members, said lever members being connected to said shaft, at opposite end portions thereof, a pedal member connected to said shaft between said pair of lever members, means for hydraulically operating the clutch, and manually operated means for operating the clutch.

9. In a control mechanism for a clutch, the combination of a housing, a pair of valves in said housing, a shaft, slidable members on said valves, resilient members opposing the movement of said slidable members on said valves, lever members mounted on said shaft, said lever members engaging said slidable members, a lever member for oscillating said shaft, means for hydraulically actuating the clutch, and manually operated means for operating the clutch.

10. In a clutch control mechanism, the combination of a pair of hydraulic valves, each of said valves being provided with a valve seating portion at one of its ends, the ends of said pair of valves provided with said valve seating portions being located in their assembled positions in oppositely disposed relationship to one another, slidable members on said valves, resilient members opposing the movement of said slidable members, manually operated means for operating said pair of valves and comprising lever members engaging said slidable members, said manually operated means simultaneously causing one of said valves to move to an open position and one of said valves to move to a closed position, hydraulic means for actuating the clutch, and manually operated means for operating the clutch.

JOHN W. TATTER.